United States Patent [19]

Galvagni

[11] Patent Number: 5,072,329

[45] Date of Patent: Dec. 10, 1991

[54] DELAMINATION RESISTANT CERAMIC CAPACITOR AND METHOD OF MAKING SAME

[75] Inventor: John Galvagni, Myrtle Beach, S.C.

[73] Assignee: AVX Corporation, New York, N.Y.

[21] Appl. No.: 678,444

[22] Filed: Apr. 1, 1991

[51] Int. Cl.$^5$ .................... H01G 4/10; H01G 7/00
[52] U.S. Cl. .................... 361/321; 29/25.42
[58] Field of Search ............ 29/25.42; 361/311–313, 361/320, 321

[56] References Cited

U.S. PATENT DOCUMENTS

| | | | |
|---|---|---|---|
| 3,223,905 | 12/1965 | Fabricius | 361/321 |
| 3,922,387 | 11/1975 | Larry | 361/321 X |
| 5,036,424 | 7/1991 | Yokotani et al. | 29/25.42 X |

*Primary Examiner*—Donald Griffin
*Attorney, Agent, or Firm*—Mark T. Basseches

[57] ABSTRACT

A multilayer ceramic capacitive device resistant to delamination and method of making the same are disclosed. Intervening layers are interposed between the metallic electrode layers and the dielectric layers, the intervening layers being comprised of ceramic compatible with the ceramic of the dielectric and increments of metal compatible with the electrode layers. In the sintering process augmented bonds are formed between the electrode metal and components of metal in the intervening layers and similarly such bonds are formed between the ceramic components of the intervening layers and the dielectric components. In addition to delamination resistance the resultant capacitors provides augmented mechanical adhesion of the terminations to the end faces of the capacitor and improved heat dissipation.

14 Claims, 1 Drawing Sheet

DELAMINATION RESISTANT CERAMIC CAPACITOR AND METHOD OF MAKING SAME

BACKGROUND OF THE INVENTION

The present invention is directed to the field of ceramic capacitive devices, such term to include capacitors, varistors and ceramic actuators.

More specifically, the invention is directed to a capacitive device having substantially reduced tendency to delaminate or fracture along the interface between the metallic electrode components of the capacitor and the ceramic dielectric layers thereof.

The invention is further directed to a method of making a capacitive device having the aforesaid advantages.

THE PRIOR ART

Conventional ceramic capacitive devices, such as capacitors, varistors and actuators, are comprised of a multiplicity of layers consisting of alternate electrode and dielectric laminae. As is well known, the composition of the ceramic components is varied in accordance with the intended application of the device Common to virtually all multilayer ceramic capacitive devices in which electrode material is present prior to sintering is the presence of noble metals, such as platinum, palladium, gold and/or other electrode forming alloys thereof between the adjacent dielectric layers, which layers are formulated in accordance with the intended end use of the device.

All such capacitive devices to a greater or lesser degree, and particularly actuator devices, exhibit a dimensional change when an electrical force is applied to opposed terminals of the device. In an actuator device the deflection is substantial and such deflection is utilized as a means of generating a mechanical force. Partially as a result of such dimensional changes, and also as a result of exposure to thermal gradients capacitive devices universally exhibit a tendency to delaminate or split at the shear line between the electrode metal and one or more of the adjacent dielectric layers. The delaminating tendency is encountered most frequently in the so-called marginless capacitors, i.e. capacitors wherein there is minimal or no contact between adjacent dielectric layers, virtually the entirety of the area between dielectric layers being occupied by electrode material. Marginless capacitors have become increasingly popular due to the volumetric savings resulting from the use of such devices.

As will be readily appreciated, if a capacitive device should shear at the interface between an electrode and electrode adjacent faces, the capacitance value would be materially affected Where the capacitive device is a varistor or an actuator, the device will be rendered essentially non-functional.

Methods have been proposed for manufacturing capacitors resistant to delamination, which methods share the general concept of forming a ceramic monolith having a multiplicity of internal voids exiting to opposite ends of the capacitor, which voids are subsequently filled with lead, nickel, or like substances. An example of such capacitive devices is found in U.S. Pat. No. 4,189,760.

Capacitive devices of the noted sort, while resistant to delamination, are virtually useless as actuators since the monolithic structure substantially reduces the ability of the capacitor to change dimensionally. Additionally, devices made in accordance of such patent cannot be made as marginless capacitors and, hence. are substantially more bulky than marginless capacitors of equivalent value.

U.S. Pat. Nos. 3,851,363 and 4.012,817, are directed to metal foil type capacitors which employ adhesive bonding agents to augment the bond between the metal foil and dielectric layers to render the polymer type capacitors with which these references deal resistant to delamination.

U.S. Pat. No. 4,429,344 relates to a mica dielectric capacitor, wherein adhesive is introduced between the mica and electrodes to prevent delamination. In order to assure that the adhesive does not prevent contact between the metallic electrodes and the dielectric mica material, the patent proposes the inclusion of conductive particulate material in the adhesive.

U.S. Pat. No. 4,729,058 discloses a varistor device wherein zinc oxide is utilized as the dielectric material.

It is known to incorporate small quantities (i.e. from 1 to 7% by weight) of ceramic in the electroding ink or paste of conventional capacitors as a means of augmenting electrode to ceramic bond. While such expedient aids to a degree in preventing delamination, it by no means, eliminates the problem. While the presence of greater proportions of ceramic in the electroding composition likely would increase the bond between layers, the increase in electrical resistance along the electrodes precludes the use of ceramic in sufficiently high concentrations to provide an effective delamination deterrent.

SUMMARY OF THE INVENTION

The present invention may be summarized as directed to an improved capacitive device (varistor, actuator or capacitor) of the ceramic type, which is characterized by its strong resistance to delamination and particularly to delamination at the shear line intervening between ceramic and electrode material.

The invention is further directed to a capacitive device of the type described, which further provides a readily soldered connection between the edge electrodes and termination material and which exhibits improved heat dissipation characteristics.

The capacitor and method of the present invention includes as a characterizing feature, the concept of interposing between the dielectric layers and the electrode layers an intervening layer comprised of a mixture of ceramic and metallic components, the ceramic inclusions of the intervening layer being compatible with or identical to the ceramic of the dielectric layer, and the metal components of the intervening layer being identical to or alloyable with the metal of the electrode layer. By use of an intervening layer of the type described between the dielectric layers and electrodes, there is provided a monolithic structure which is highly resistant to cleavage or fracture along planes parallel to the electrode layers.

In view of the increased coherence of the device, it is possible to fabricate marginless capacitive devices having high capacitance values per unit volume Additional benefits of the provision of the mixed ceramic-metal layers between the dielectric layers and the electrodes is the efficiency with which heat is dissipated through the unit and added bond strength of solder or other termination materials applied to the ends of the capacitive unit, which terminations now bond both to the exposed edge portions of the electrodes and to the tendril-like metal structure at the edge portions of the intervening layers.

It is accordingly an object of the invention to provide a multilayer ceramic capacitive device characterized in that it provides a high resistance to delamination along planes parallel to the planes of the electrodes.

A further object of the invention is to provide a method of making devices of the type described.

Still a further object of the invention is the provision of a capacitive device of the type described and to a method of making the same, which includes the formation of an intervening layer between the dielectric and electrode layers, which intervening layer is comprised of a mixture of ceramic and metal, the ceramic being compatible to or identical to the material of the dielectric layer and the metallic components of the intervening layer being of material identical to or alloyable with the material of the metallic electrode layers.

Still other and further objects of the invention will appear herein or be hereinafter pointed out in connection with the detailed description of the drawings.

DETAILED DESCRIPTION OF DRAWINGS

Figure 1:
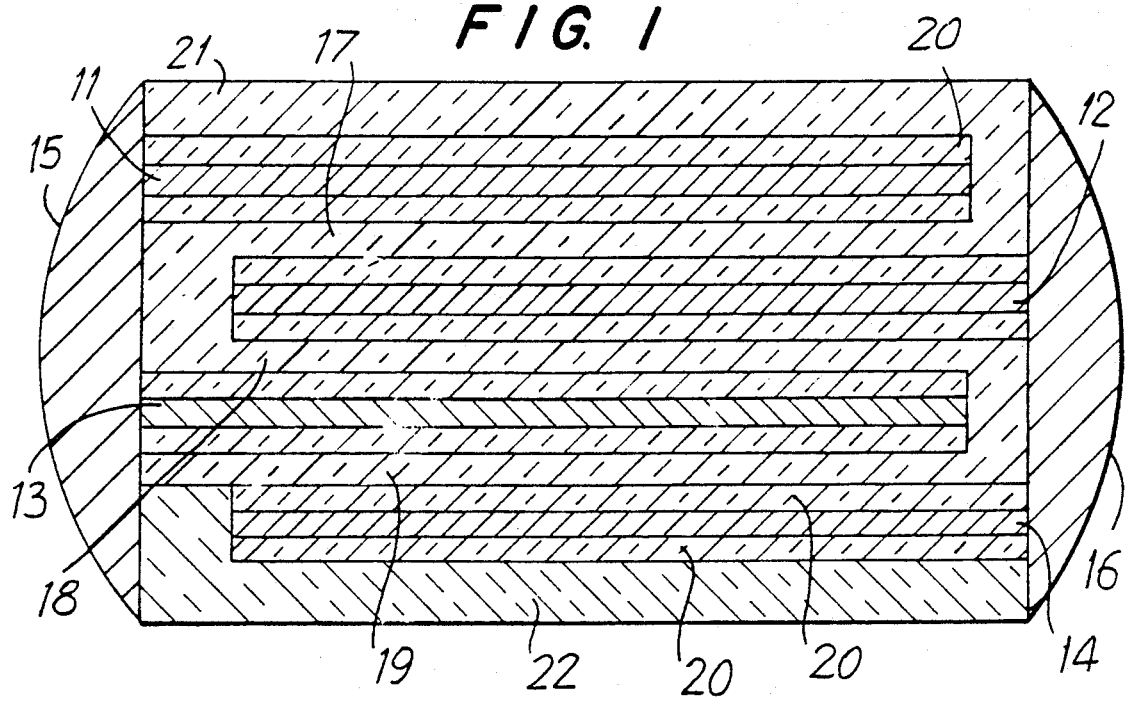
FIG. 1 is a schematic sectional view through a capacitor in accordance with the invention.

Referring now to FIG. 1 there is disclosed in schematic fashion a multilayer ceramic capacitor, the illustrated capacitor including four active electrodes 11, 12, 13 and 14, electrodes 11 and 13 being interconnected by termination 15, and electrodes 12 and 14 being interconnected by termination 15 The illustrated embodiment includes three active dielectric layers 17, 18 and 19.

In a conventional ceramic capacitor, dielectric layer 17 would have electrodes 11,12 bonded to its opposed surfaces and dielectric 18 would have electrodes 12,13 bonded to its opposed surfaces, etc.

It has been determined that in large measure the fracturing or cleavage observed in capacitive devices occurs at the interface between the metallic electrode and the ceramic dielectric.

In accordance with the invention, each metallic electrode 11, 12, 13 and 14 is sandwiched between intervening layers 20, the intervening layers in all instances being assigned the reference numeral 20. In all cases, the intervening layers 20 are coextensive, sizewise, with the respective electrode layers, the opposed surfaces of which they engage.

As will be more specifically described hereinafter, the intervening layers 20 are comprised of a mixture of ceramic and metal, the ceramic being of a composition identical to or fusible with the ceramic of the dielectric layers of the capacitor, and the metal being of a material identical to or alloyable with the metal of the electrode layers 11, 12, 13 and 14 under sintering conditions.

Figure 2:
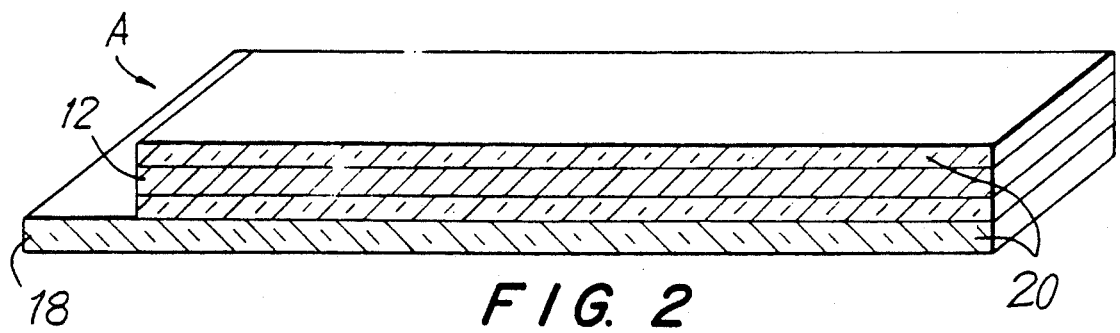
FIGS. 2 and 3 are schematic perspective views partially in section of multilayer capacitor subassemblies, which when stacked in selected multiples of numbers form a capacitor as shown in FIG. 1.
Figure 3:
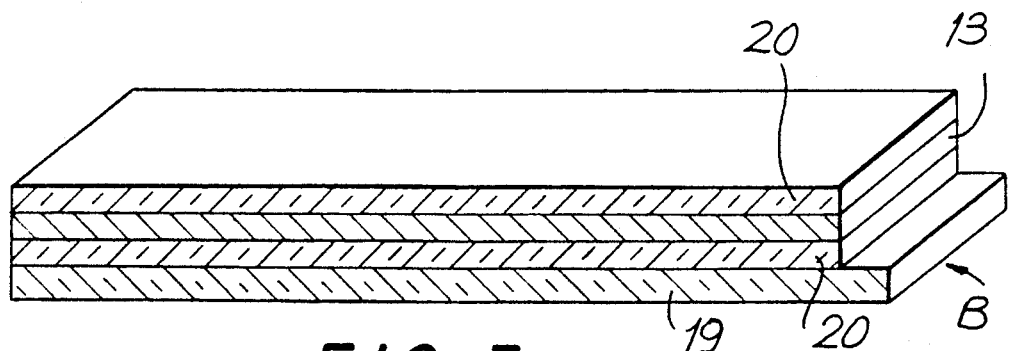

As best appreciated from an inspection of FIGS. 2 and 3, the capacitor of FIG. 1 is desirably built of a multiplicity of building blocks of alternate types shown in FIGS. 2 and 3. Each of the building blocks is comprised of a substrate dielectric layer, e.g. a base dielectric layer 19, electrode layer 13 and intervening layers 20 to either side of the electrode layer 13.

It will be observed that the composite illustrated in FIG. 2 is identical to that of FIG. 3, except that the dielectric substrate 18 of FIG. 2 projects beyond the electrode layer and registering intervening layers 20 on the left hand side, as viewed in FIG. 2, whereas substrate 19 projects beyond the layers 20—20 and 13 of FIG. 3 to the right side beyond such layers.

In essence, the units A and B as depicted in FIGS. 2 and 3 are essentially identical to the units employed to manufacture conventional ceramic capacitors with the exception that instead of a single electrode metal layer being stacked on the green ceramic tape used to form the dielectric, the structure stacked on the green tape in accordance with the instant invention is a three layer structure, namely an electrode layer sandwiched between two intervening layers comprised of a mixture of ceramic and metal.

As will be readily appreciated by those skilled in the art, the finished capacitor may be comprised of as many of the preforms A and B as desired, a capacitive device of a hundred such preforms being not unusual.

In the usual manner, a desired numbered of preforms are stacked, subjected to compression, heated to drive off organics, and finally subjected to sintering temperatures Following sintering, terminations 15 and 16 are applied as by application of conductive frits, vapor deposition followed by solder application, etc. The fabrication techniques involved in the assembly, processing, and termination of the capacitor devices may be carried out in a manner identical to that conventionally employed for the processing of ceramic capacitors wherein there is direct metal to ceramic contact, the sole significant difference being the application by screening or the like of the intervening layers below and above the screened electrode.

Briefly stated, the preforms A and B are fabricated by applying, by screening, to a conventional green ceramic tape such as described in U.S. Pat. No. 3,235,939, a first ceramic and metal containing ink pattern to form an intervening layer, e.g. a layer 20. Typically, a multiplicity of layers 20 will be formed at spaced positions along a length of green ceramic tape through a masking apparatus overlaid on the tape. Thereafter, and without moving the masking apparatus, and following drying of the initially applied intervening layers, a metallizing ink is applied through the masks to form the electrode layers Finally, a further intervening layer is applied over the dried electrode forming layer through the still positioned mask.

A desired multiplicity of the thus imprinted tapes are stacked, subjected to compression, and diced along lines to provide capacitor preforms in the configuration shown in FIG. 1. Normally, an upper and a lower ceramic tape may be applied before dicing and compression to form the encapsulating layers 21,22.

The diced green ceramic preforms are next subjected to burn out of organics, sintering, termination and normally encapsulation.

The procedures set forth above are essentially identical where it is desired to form a ceramic capacitor, varistor or actuator. As is well known in the art, the ceramic formulations, electrode compositions and processing procedures are to be tailored in accordance with the end function of the capacitive devices.

While the drawings have illustrated a capacitive device, which may be referred to as a marginless device, since the side or longitudinal edges of the electrodes extend to the side margins of the device, the method and article may be configured for the formation of virtually any conventional capacitive assembly For example, where the device is to be used as an actuator and, hence, growth upon application of voltage is to be maximized, the device may employ the manufacturing method of U.S. Pat. No. 4,903,166, which minimizes or eliminates the growth inhibiting connections between adjacent dielectric layers.

REPRESENTATIVE EXAMPLE

In compliance with the "best mode" requirements of the U.S. patent laws, there will be described below a representative specific formulation for the various components of a particular ceramic device It should be recognized that virtually any combination of ceramic and metallizing employed in the fabrication of a given capacitor can, by the use of intervening layers which incorporate increments of the metal (or a metal miscible therewith and resistant to sintering temperatures) of the electrode layer and increments of the ceramic (or a ceramic fusible thereto) forming the dielectric layer, be processed to provide the advantages of the instant invention.

In general, the ratio of metal to ceramic components of the intervening layer (by weight) should be in the range of from about 3 to 1 to 8 to 1. This ratio should not, however, be considered limitative and may vary in accordance with the specific combination of ceramic and electrode metal employed. Suitable ratios for the intervening layers may be readily determined on a trial and error basis with due consideration given to such factors as economy. If, for instance, a costly electroding material such as palladium is employed, it is likely that the intervening layer would, for reasons of economy, incorporate a relatively low ratio of palladium with full recognition that while the resultant capacitor will be far more resistant to delamination than a conventionally fabricated capacitor, it could be made more resistant to delamination by increasing the percentage of palladium at added cost.

The capacitive device and method described below is representative of a formulation for forming an actuator device, the delamination improvement of the instant invention being of particular importance in connection with such devices since the same are specifically intended to expand and contract responsive to application of electrical charges and, hence, being particularly subject to delamination.

A dielectric composition suitable for forming the actuator is set forth in detail in U.S. Pat. No. 4,903,166, which is incorporated herein by reference, at Column 6, lines 37 through 52. A tape of the "green" ceramic is cast as set forth in the above referenced patent to a thickness of 8 mils and the volatile solvents are permitted to evaporate. Thereafter, a multiplicity of preforms as illustrated in FIGS. 2 and 3 are fabricated as follows:

Electrode Ink a platinum based electroding ink is prepared in accordance with the following composition, the parts being listed by weight:

| 34.1% | solvents | (25.6% mineral spirits - 8.5% tridecanol (Amine D) |
| --- | --- | --- |
| .9% | disbursants | |
| 5% | finely divided cellulose | (3.1% high molecular weight EHEC, 1.9% low molecular weight EHEC) |
| 6% | ceramic | (same formulation as employed for dielectric layer) |
| 54% | platinum powder | |

Intervening Layer Formulation

| 34.1% | solvents | (as above) |
| --- | --- | --- |
| .9% | disbursants | (as above) |
| 5% | cellulose | (3.1% high molecular weight EHEC, 1.7% low molecular weight EHEC) |
| 10.6% | ceramic | (same formulation as dielectric) |
| 49% | platinum powder. | |

Since the parts are noted as by weight, the ceramic content of the intervening layer formulation is much greater than the ceramic content of the electrode forming layer. The structures shown in FIG. 2 and 3 are fabricated by first screening a pattern over the dielectric layer, i.e. the layer 18, of the intervening layer material.

Screening may be effected by utilizing a 280 mesh screen employing an 80 durometer squeegee material After drying, the intervening layer pattern are overprinted with the electroding formulation in the manner set forth above. Following drying of the electroding formulation, a further pattern of intervening layer formulation is printed over the electrode pattern, the three noted patterns being imprinted in precise registry.

As will be understood by those familiar with the fabrication of capacitor devices, a multiplicity of the patterns as described are simultaneously printed over the dielectric tape in predetermined positions relative to each other. Thereafter a multiplicity of tapes are stacked one atop the other and interposed between external ceramic tapes, such as to provide an multiplicity of preforms as shown schematically in FIG. 1. While the preform of FIG. 1, for easy of illustration, is configured of four active preforms (two of the type shown in FIG. 2 and two as per FIG. 3), the stack may be comprised of 100 or more layers The stack of tapes is thereafter laminated at about 65 degrees C under pressure of 1,500 psi, following which individual green capacitor preforms are cut from the stack as by dicing or sawing in known manner along cutting lines which expose end portions of the layers at opposite ends of the individual capacitor preforms so as to permit terminations to the electrodes as shown in FIG. 1.

The green capacitors are subjected to burn-out of organics by heating the same in an oven for 72 hours in air, the oven temperature being slowly raised to 500 degrees C. The parts are thereafter sintered in air, which, with the specific ceramic noted, incorporates a lead atmosphere, for three hours at approximately 1,150 degrees C.

The devices are thereafter terminated in conventional manner, i.e. through the use of a termination material (metal-glass frit) such as Dupont 6134. The termination material is sintered at 750 degrees C in a belt furnace with a profile of one-half hour total, three (3) minutes at the peak temperature. The finished capacitive devices (actuators) may have leads soldered to the terminations and may be encapsulated in accordance with the end use environment.

The devices may be configured as shown in the instant schematic drawings, or may be processed in the configuration of the above identified U.S. Pat. No. 4,903,166, which provides for void areas surrounding the electrode and intervening layers at all edges of the devices except the two edges to which terminations are to be applied.

It is to be understood that the method of the instant invention is by no means limited to actuator devices and is generically applicable to multilayer ceramic capacitive devices of all types.

By way of example, the method of the instant invention may be practiced utilizing the procedures set forth in U.S. Pat. No. 3,235,939 (Rodriguez et al) of Feb. 22, 1966, which is incorporated herein by reference the sole variation being the addition of intervening layers of ceramic-metal mix.

Central to the departure of the instant invention from the prior art conventional modes of fabricating multilayer ceramic capacitors is the concept of forming between the dielectric layers and the electrode layers intervening layers comprised of a mixture of ceramic identical to or compatible with the ceramic of the host dielectric material and metal identical to or alloyable with the metal defining the electrode layer.

It will thus be understood by workers in the ceramic capacitor art that virtually any multilayer ceramic capacitive device wherein resistance to delamination is of primary importance may be adapted to the use of the instant procedures. The method is considered of especially great importance in the fabrication of devices such as are illustrated in U.S. Pat. No. 4,903,166, wherein contact between adjacent ceramic layers is minimized or eliminated and, hence, the primary bond between the various layers of the capacitive device is provided by the adhesion between electrode and ceramic.

The optimum proportion of metal and ceramic components of the intervening layers may be readily determined on a trial and error basis, and while the provision of such an intervening layer will always increase the delamination resistance of the finished capacitor, the selection of optimum proportions requires consideration of such factors as cost and the capacitance per unit volume required Best results are obtained where the ceramic and metal of the intervening layers are identical to those of the host ceramic and electrode.

The use of intervening layers slightly reduces the amount of capacitance which may be achieved in a given volume. However, in most instances, the reliability of the capacitive device more than offsets the loss of volumetric efficiency.

As will be appreciated by those skilled in the art and familiarized with the instant disclosure numerous variations in details of construction, formulation, and processing steps may be made without departing from the spirit of the instant invention which is accordingly to be broadly construed with the scope of the appended claims.

I claim:

1. In a delamination resistant monolithic multilayer ceramic capacitive device comprising a plurality of ceramic dielectric layers and a plurality of metallic electrode layers interposed between said dielectric layers, the improvement which comprises discrete intervening layers interposed between said dielectric and electrode layers, said intervening layers being comprised of a combination of a ceramic material compatible with and fused to said dielectric layers, and metallic materials compatible with and fused to the metal of said electrode layers.

2. A device in accordance with claim 1 wherein the composition of said ceramic material of said intervening layers is comprised of the same ceramic material as said dielectric layers.

3. A device in accordance with claim 2 wherein said metallic electrode layers include from about 1 to 7 percent by weight of fused ceramic material compatible with and fused to said intervening layers.

4. A device in accordance with claim 1 wherein the metallic material of said intervening layer is comprised of a metal, the same as or alloyable with, the metal of said electrode layers.

5. A device in accordance with claim 1 wherein the ratio by weight of metal to ceramic components in said intervening layers is from about 2 to 1 to 8 to 1.

6. The method of manufacturing a multilayer ceramic capacitive device which includes the steps of forming a plurality of preforms, said preforms including a green ceramic dielectric layer, depositing a first pattern on an upper surface of said layers, said pattern being comprised of a mixture of ceramic particles and metallic particles, said ceramic particles being fusible to the ceramic of said dielectric layer under sintering conditions, depositing an electrode forming second pattern over and in registry with said first pattern, said second pattern comprising metallic particles in higher concentration than the concentration of metallic particles of said first pattern, the metal components of said second pattern being comprised of the same composition as or miscible with the metallic components of said first pattern under sintering conditions, depositing a third pattern over and in registry with said second pattern, the composition of said third pattern being the same as the composition of said first pattern, thereafter stacking a plurality of said preforms one atop the other such that the third patterns of said preforms engage the lower surfaces of the dielectric layers of the next adjacent preforms and the patterns of adjacent said preforms are in partial registry, thereafter sintering said stacked preforms to form a monolith wherein ceramic components of said first and third patterns are fused to the dielectric layers abutting said first and second patterns and the metallic components of said first and third patterns are bonded to metallic components of said second patterns.

7. The method of claim 6 wherein the ratio by weight of metal to ceramic in said first and third patterns is from about 2 to 1 to 8 to 1.

8. The method of claim 6 wherein said second pattern contains from about 1 to 7 percent by weight of ceramic particles fusible to the ceramic particles of said first and third patterns.

9. The method of claim 6 wherein one edge portion of each of said second patterns extends to an outer margin of said device, the edge portions of alternate said second patterns exiting from said device in registry with each other and at positions offset from the exit position of the edge portions of said second patterns intervening between said alternate second patterns.

10. The method of claim 9 and including the step of applying separate respective conductive terminations to said outer margins at the edge portions of said alternate second patterns and the edge portions of said second patterns intervening between said alternate second patterns.

11. The method of manufacturing a multilayer ceramic capacitive device which includes the step of fabricating a preform including a green dielectric layer comprised of ceramic particles and a binder, forming a pair of intervening layers comprised of ceramic particles, binder, and particulate metal, sandwiching said dielectric layer between said intervening layers, applying an electrode forming composition including particulate metal material to the surfaces of said intervening layers remote from said dielectric layer, the metal of said electrode layer, when molten, being miscible with the molten metal incorporated in said intervening layers, and thereafter heating said preform for a time sufficient to drive off said binder, melt said particulate metal materials, and sinter said ceramic particle.

12. The method of claim 11 wherein the ratio of metal to ceramic by weight, in said intervening layer, is in the range of from about 2 to 1 to 8 to 1.

13. The method of claim 12 wherein said electrode composition comprises from about 1 to 6 percent by weight of ceramic particles of the same composition as the ceramic of said dielectric and intervening layers.

14. The method of claim 11 wherein the ceramic content of said intervening layers is comprised of the same ceramic composition as the ceramic dielectric layer.

* * * * *